(12) United States Patent
Seiler et al.

(10) Patent No.: US 7,978,194 B2
(45) Date of Patent: Jul. 12, 2011

(54) METHOD AND APPARATUS FOR HIERARCHICAL Z BUFFERING AND STENCILING

(75) Inventors: Larry D. Seiler, Boylston, MA (US); Stephen L. Morein, Cambridge, MA (US)

(73) Assignee: ATI Technologies ULC, Markham, Ontario (CA)

( * ) Notice: Subject to any disclaimer, the term of this patent is extended or adjusted under 35 U.S.C. 154(b) by 168 days.

(21) Appl. No.: 10/790,953

(22) Filed: Mar. 2, 2004

(65) Prior Publication Data

US 2005/0195187 A1 Sep. 8, 2005

(51) Int. Cl.
*G06T 15/40* (2006.01)
*G06T 15/50* (2006.01)
*G06T 1/00* (2006.01)
*G09G 5/02* (2006.01)

(52) U.S. Cl. ........ 345/422; 345/421; 345/426; 345/501; 345/597; 345/598

(58) Field of Classification Search ........................ None
See application file for complete search history.

(56) References Cited

U.S. PATENT DOCUMENTS

| | | | | |
|---|---|---|---|---|
| 5,579,455 | A * | 11/1996 | Greene et al. | 345/422 |
| 5,949,428 | A * | 9/1999 | Toelle et al. | 345/589 |
| 5,977,980 | A | 11/1999 | Aleksicy | |
| 6,169,553 | B1 | 1/2001 | Fuller et al. | |
| 6,188,394 | B1 | 2/2001 | Morein et al. | |
| 6,195,737 | B1 | 2/2001 | Hollister et al. | |
| 6,226,003 | B1 * | 5/2001 | Akeley | 345/419 |
| 6,384,822 | B1 * | 5/2002 | Bilodeau et al. | 345/422 |
| 6,407,741 | B1 | 6/2002 | Morein et al. | |
| 6,457,034 | B1 | 9/2002 | Morein et al. | |
| 6,492,991 | B1 | 12/2002 | Morein et al. | |
| 6,525,726 | B1 | 2/2003 | Xie Feng et al. | |
| 6,636,212 | B1 * | 10/2003 | Zhu | 345/421 |
| 6,646,639 | B1 * | 11/2003 | Greene et al. | 345/422 |
| 6,707,462 | B1 | 3/2004 | Peercy et al. | |
| 6,812,927 | B1 * | 11/2004 | Cutler et al. | 345/506 |
| 6,894,689 | B1 * | 5/2005 | Greene et al. | 345/422 |
| 6,999,087 | B2 * | 2/2006 | Lavelle et al. | 345/543 |
| 7,023,437 | B1 * | 4/2006 | Voorhies et al. | 345/420 |

(Continued)

OTHER PUBLICATIONS

Foley et al. Computer Graphics: Principles and Practice. Addison-Wesley Pub. Co., Inc. pp. 870-871, § 18.3.8. 1997.*

(Continued)

*Primary Examiner* — Xiao M Wu
*Assistant Examiner* — Tize Ma
(74) *Attorney, Agent, or Firm* — Vedder Price P.C.

(57) ABSTRACT

A method and apparatus for hierarchical Z buffering stenciling includes comparing an input tile Z value range with a hierarchical Z value range and a stencil code. The method and apparatus also updates the hierarchical Z value range and stencil code in response the comparison and determines whether to render a plurality of pixels within the input tile based on the comparison of the input tile Z value range with the hierarchical Z value range and stencil code. In determining whether to render the tile, a stencil test and a hierarchical Z value test is performed. If one of the tests fails, the tile is killed as it is determined that the pixels are not visible in the graphical output. If the stencil test passes and the hierarchical Z test passes, the pixels within the tile are rendered, as it is determined that the pixels may be visible.

24 Claims, 7 Drawing Sheets

U.S. PATENT DOCUMENTS

| | | | |
|---|---|---|---|
| 7,030,878 B2* | 4/2006 | Xu et al. | 345/422 |
| 7,068,272 B1* | 6/2006 | Voorhies et al. | 345/422 |
| 7,170,513 B1* | 1/2007 | Voorhies et al. | 345/421 |
| 7,184,040 B1* | 2/2007 | Tzvetkov | 345/421 |
| 7,248,261 B1* | 7/2007 | Hakura | 345/426 |
| 7,301,537 B2* | 11/2007 | Strom et al. | 345/422 |
| 7,528,839 B1* | 5/2009 | Cunniff et al. | 345/553 |
| 2003/0038819 A1* | 2/2003 | Lewis | 345/611 |
| 2003/0043148 A1* | 3/2003 | Mei et al. | 345/421 |
| 2003/0151606 A1 | 8/2003 | Morein et al. | |
| 2004/0119709 A1* | 6/2004 | Strom et al. | 345/421 |
| 2004/0169651 A1 | 9/2004 | Everitt et al. | |
| 2005/0134588 A1* | 6/2005 | Aila et al. | 345/426 |
| 2006/0033735 A1 | 2/2006 | Seiler et al. | |
| 2006/0114261 A1* | 6/2006 | Morphet | 345/553 |

OTHER PUBLICATIONS

Everitt et al. Practical and Robust Stenciled Shadow Volumes for Hardware-Accelerated Rendering. NVIDIA Corporation. 2002.*

Schrocker. Visibility Culling for Game Applications. Thesis. Institute of Computer Vision and Graphics. 2001.*

Aila et al. A Hierarchical Shadow Volume Algorithm. Proceedings of the ACM SIGGRAPH/EUROGRAPHICS Conference on Graphics Hardware. 2004.*

International Search Report for International Application No. PCT/US2005/006744; European Patent Office; dated Jun. 21, 2005.

Per-Fragment Operations and the Framebuffer; pp. 141-148; Version 1.2.1; Apr. 1, 1999.

Greene, Ned; Hierarchical Polygon Tiling with Coverage Masks; Computer Graphics Proceedings; Aug. 4, 1996; pp. 65-74.

Chen, Cheng-Hsien et al.; Two-Level Hierarchical Z-Buffer for 3D Graphics Hardware; National Chiao Tung University; 2002; pp. 253-256; Taiwan, ROC.

Blythe, David; Programming with OpenGL: Advanced Rendering, section 14: Using the Stencil Buffer; from www.opengl.org; Jun. 9, 2005.

Mitchell, Jason L., "Applications of Explicit Early-Z Culling," SIGGRAPH 2004-Real-Time Shading Course, pp. 14-1 thru 14-9.

The OpenGL Programming Guide: The Official Guide to Learning OpenGL, Release 1.1. 2nd ed., New York: Addison-Wesley Longman, Limited, 1997.

* cited by examiner

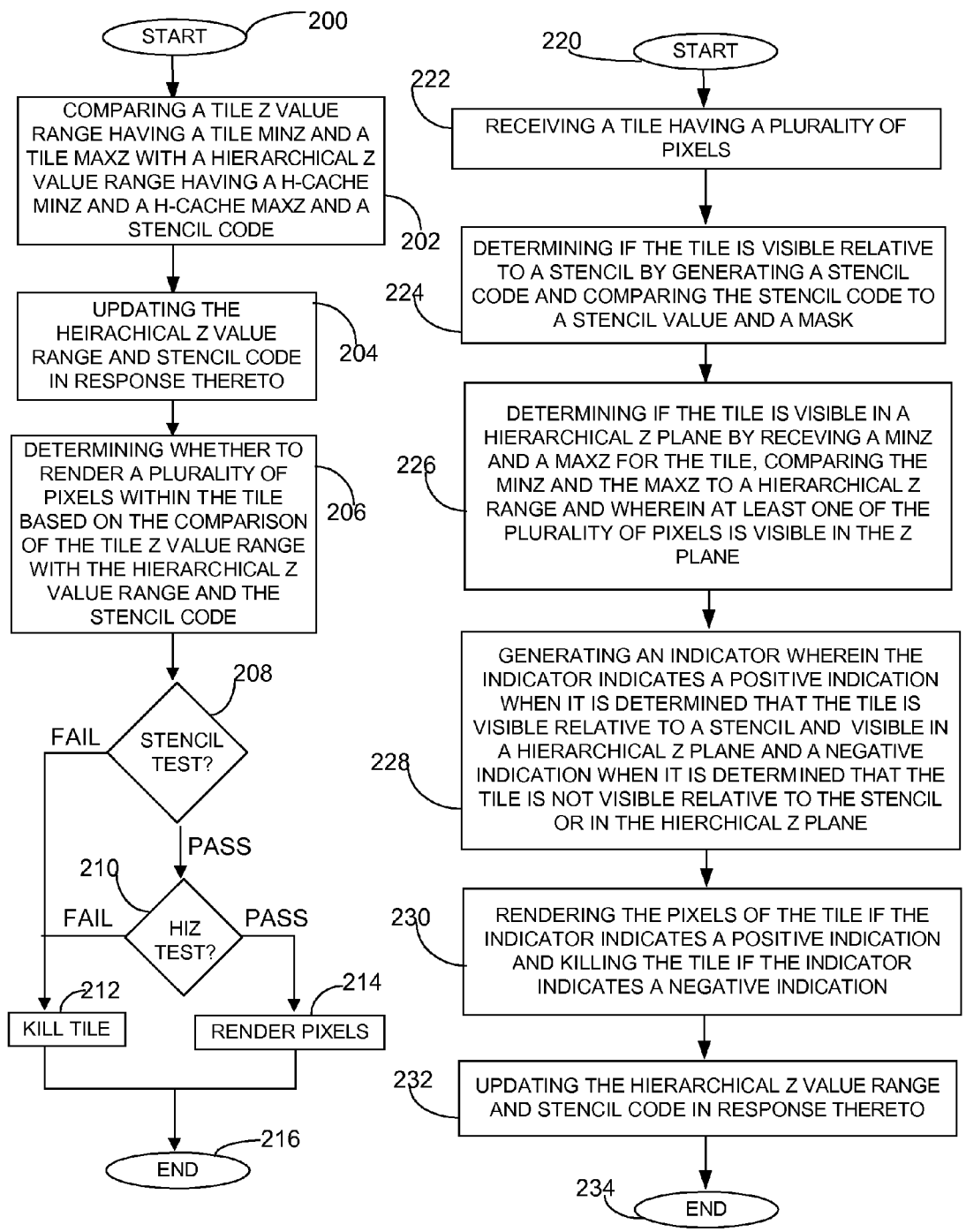

| ><= | Name | Description |
|---|---|---|
| 000 | Background | Replace all stencil values with background when reading the tile from memory |
| 001 | Equal | Background value is equal to all stencil values. |
| 010 | Less | Background value is less than all stencil values. |
| 011 | Lequal | Background value less than or equal to all stencil values. |
| 100 | Greater | Background value is greater than all stencil values. |
| 101 | Gequal | Background value is equal to or greater than all stencil values. |
| 110 | Notequal | Background value is greater than or less than all stencil values, but not equal to any stencil values. |
| 111 | Unknown | Nothing is known about how the background value compares to the stencil values. |

FIG. 7

| Stencil Code | Stencil Function | | | | | | | |
|---|---|---|---|---|---|---|---|---|
| | Never | Always | Less | Lequal | Equal | Gequal | Greater | Nequal |
| Bkg | Fail | Pass | Fail | Pass | Pass | Both | Fail | Fail |
| Equal | Fail | Pass | Fail | Pass | Pass | Both | Fail | Fail |
| Less | Fail | Pass | Pass | Pass | Fail | Fail | Fail | Pass |
| Lequal | Fail | Pass | Both | Pass | Both | Both | Fail | Both |
| Greater | Fail | Pass | Fail | Fail | Fail | Pass | Pass | Pass |
| Gequal | Fail | Pass | Fail | Both | Both | Pass | Both | Both |
| Nequal | Fail | Pass | Both | Both | Fail | Both | Both | Pass |
| Unknwn | Fail | Pass | Both | Both | Both | Both | Both | Both |

FIG. 8

| Stencil Code | Stencil Operation | | | | | | | |
|---|---|---|---|---|---|---|---|---|
| | Keep | Zero Bkg>0 | Zero Bkg 0 | Replace | Incr Bkg < ~1 | Incr Bkg ~1 | Decr Bkg>0 | Decr Bkg 0 | Invert Bkg hi 1 | Invert Bkg hi 0 |
| Bkg | Bkg | Less | Equal | Bkg | Greater | Equal | Less | Equal | Less | Greater |
| Equal | Equal | Less | Equal | Equal | Greater | Equal | Less | Equal | Less | Greater |
| Less | Less | Less | Equal | Equal | Lequal | Lequal | Less | * | Unknwn | Greater |
| Lequal | Lequal | Less | Equal | Equal | Unknwn | Lequal | Less | * | Unknwn | Greater |
| Greater | Greater | Less | Equal | Equal | Greater | * | Gequal | Gequal | Less | Unknwn |
| Gequal | Gequal | Less | Equal | Equal | Greater | * | Unknwn | Gequal | Less | Unknwn |
| Nequal | Nequal | Less | Equal | Equal | Unknwn | Unknwn | Unknwn | Unknwn | Unknwn | Unknwn |
| Unknwn | Unknwn | Less | Equal | Equal | Unknwn | Unknwn | Unknwn | Unknwn | Unknwn | Unknwn |

FIG. 9

| Depth Comparison | Depth Function | | | | | | | |
|---|---|---|---|---|---|---|---|---|
| | Never | Always | Less | Lequal | Equal | Gequal | Greater | Nequal |
| Pmax < Tmin | Fail Tmin: Tmax | Pass Pmin: Tmax | Pass Pmin: Tmax | Pass Pmin: Tmax | Fail Tmin: Tmax | Fail Tmin: Tmax | Fail Tmin: Tmax | Pass Pmin: Tmax |
| Pman ≥ Tmin Pmin < Tmin Pmax ≤ Tmax | Fail Tmin: Tmax | Pass Pmin: Tmax | Both Pmin: Tmax | Both Pmin: Tmax | Both Tmin: Tmax | Both Tmin: Tmax | Both Tmin: Tmax | Both Pmin: Tmax |
| Pmin < Tmin Pmax > Tmax | Fail Tmin: Tmax | Pass Pmin: Pmax | Both Pmin: Tmax | Both Pmin: Tmax | Both Tmin: Tmax | Both Tmin: Pmax | Both Tmin: Pmax | Both Pmin: Pmax |
| Pmin > Tmin Pmax < Tmax | Fail Tmin: Tmax | Pass Tmin: Pmax | Both Tmin: Tmax | Both Tmin: Tmax | Both Tmin: Tmax | Both Tmin: Pmax | Both Tmin: Tmax | Both Tmin: Tmax |
| Pmin ≤ Tmax Pmin > Tmin Pmax > Tmax | Fail Tmin: Tmax | Pass Tmin: Pmax | Both Tmin: Tmax | Both Tmin: Tmax | Both Tmin: Tmax | Both Tmin: Pmax | Both Tmin: Pmax | Both Tmin: Pmax |
| Pmin > Tmax | Fail Tmin: Tmax | Pass Tmin: Pmax | Fail Tmin: Tmax | Fail Tmin: Tmax | Fail Tmin: Tmax | Pass Tmin: Pmax | Pass Tmin: Pmax | Pass Tmin: Pmax |

FIG. 10

METHOD AND APPARATUS FOR HIERARCHICAL Z BUFFERING AND STENCILING

FIELD OF THE INVENTION

The invention relates generally to graphics rendering and more particularly to comparing pixel values prior to graphics rendering.

BACKGROUND OF THE INVENTION

Video graphics circuits generate pixel information for objects to be displayed on a computer screen, monitor or television. The source for the object may be television broadcasts, cable television transmissions, satellite television transmissions, computer programs, web pages, and so on. For computer screens, video graphic circuits partition each of the objects to be displayed into triangles. Each triangle is stored as three vertexes and corresponding display parameters for each vertex. The corresponding display parameters include color parameters (red, green, blue), display or pixel locations parameters (x, y, z) and texture parameters (s, t, w).

For corresponding display parameters, a video graphics circuit calculates slopes and associated display parameters for each part within the triangle based on the slopes and corresponding display parameters. The slopes are associated with display parameters and are stored in a triangle descriptor list, which is subsequently used to calculate pixel information.

When a two dimensional object, or one triangle, is to be displayed, there are no unnecessary steps to the process described above. When more than one object is to be displayed and the objects overlap, there are unnecessary steps because pixel information is calculated for each triangle of the object. When all of the pixel information for each object is calculated, a comparison is performed to determine which object is in the foreground. For the object that is in the background with respect to another object, the pixel information for the portion of the object that is overlapped is discarded. Thus, the calculation of such pixel information was unnecessary and adversely affects the efficiency of the video graphics circuit.

If only a small portion of an object is overlapped, the amount of unnecessary pixel information calculations are minimal, there is a minimal adverse affect on the video graphic circuit's efficiency. If, however, the object has a substantially overlapped portion, then the number of unnecessary calculations increases and the efficiency of the video graphics circuit is affected. This may be compounded where several objects have overlapping portions and only one object will be visible in the foreground and be entirely displayed. For example, assume that several faces are to be displayed and they overlap. To begin the display process, the video graphics circuit calculates the slopes and associated display parameters for each triangle of a face, which includes up to 20,000 triangles, and stores the value in the triangle descriptor list and stores the pixel information. The process is repeated for each face to be displayed. Once all of the pixel information is generated, the video graphics circuit compares the components of the faces to determine which one is in the foreground in the overlapped areas.

Another inefficiency arises when a stencil is placed on an output image, whereupon all pixels having a location within the stencil are not visible. A typical stencil display is a shadow based on the position of a light source, wherein pixels that fall within the shadow are not visible and therefore may be unnecessarily rendered. Although, simply because a pixel has a common x,y coordinate, it must further be determined whether the pixel is visible in the z plane, i.e. visible in front of the shadow. Therefore, since the stencil blocks out all pixels at the same x,y address that have a smaller z address than the stencil, i.e. hidden by the shadow, it is inefficient to render the pixels which are not visible by the shadow.

To overcome these inefficiencies, conventional video graphics circuits perform a hierarchical z-buffering technique. Hierarchical z-buffering is performed by comparing multiple pixels having the same x,y location, wherein the z value of a pixel is compared to a stored z value, where the stored z value represents the outermost visible pixel, i.e. having the highest z value. If the pixel to be rendered has a z value that is less than stored z value, the pixel is then rendered because the pixel will be visible. Also, the z value is updated to represent the value of the rendered pixel, as any other pixels at the same location having a smaller z value will be hidden by the rendered pixel.

It is also known for a video graphics circuit to perform a stenciling operation wherein a pixel to be rendered is compared to a stencil and if the pixel will not be visible because it is hidden by the stencil, the pixel will not be rendered. Stenciling operations typically use a stencil mask upon which the pixel is referenced, wherein a determination may be made, based on the x,y,z coordinate of the pixel relative to the stencil mask, whether the rendered pixel will be visible.

Although, conventional video graphics circuits cannot perform both hierarchical z-buffering and stencil operations because the circuit must choose to perform either the hierarchical z-buffering or the stenciling. The hierarchical Z buffering is typically disabled during the stencil test because the stencil test interacts with the Z buffering operation. Therefore, without a means of performing a hierarchical stencil test, it is in general impossible to know the correct result for a hierarchical depth test.

Consequently, there exists a need for a rendering system which efficiently combines hierarchical z-buffering and stenciling operations to a plurality of pixels which are to be rendered.

BRIEF DESCRIPTION OF THE DRAWINGS

The invention will be more readily understood with reference to the following drawings wherein:

FIG. 5 is a flowchart illustrating a method for video graphics processing in accordance with one embodiment of the present invention;

FIG. 6 is a flowchart illustrating the method for video graphics processing in accordance with one embodiment of the present invention;

FIG. 7 is a table illustrating stencil codes for a tile in accordance with one embodiment of the present invention;

FIG. 8 is a table illustrating stencil functions for a tile in accordance with one embodiment of the present invention;

FIG. 9 is a table illustrating stencil operation results for a tile in accordance with one embodiment of the present invention; and FIG. 10 is a table illustrating depth function and tile value updates in accordance with one embodiment of the present invention.

DETAILED DESCRIPTION OF A PREFERRED EMBODIMENT OF THE INVENTION

The disclosed invention includes a method and apparatus for hierarchical Z buffering and stenciling that compares an input tile Z value range with a hierarchical Z value range and a stencil code. The method and apparatus also updates the hierarchical Z value range and stencil code in response to the comparison and determines whether to render a plurality of pixels within the input tile based on the comparison of the input tile Z value range with the hierarchical Z value range and stencil code. In determining whether to render the plurality of pixels within the tile, two different tests are performed, a stencil test and a hierarchical Z value test, otherwise known as a depth test. If the stencil test fails or the hierarchical Z value test fails, a determination is made to not render the pixels, otherwise referred to a killing the tile, as it is determined that the pixels are not visible in the graphical output. It should be noted that the stencil values may need to be changed, even when the tile is killed because the depth and pixel color will not change. If the stencil test passes and the hierarchical Z test passes, the pixels within the tile are rendered, as it is determined that there is a likelihood the pixels within the tile will be visible.

Moreover, the tile Z value range contains a tile MinZ and a tile MaxZ. The hierarchical Z value range contains a hierarchical cache MinZ and a hierarchical cache MaxZ, as these values are stored in a hierarchical Z cache and stencil buffer.

Figure 1:
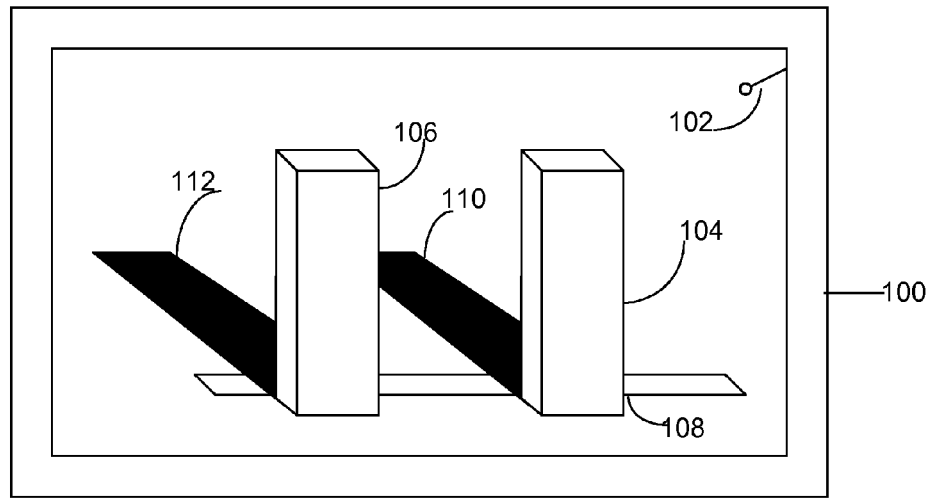
FIG. 1 is a graphical representation of a computer display which is in accordance with the present invention.

FIG. 1 illustrates a computer display 100 having a graphical image rendering by a graphics processing device in accordance with one embodiment of the present invention. The computer display 100, such as a computer monitor, a television monitor, an LCD display, a CRT display, or any other suitable display as recognized by one skilled in the art, displays three images relative to a light source 102. The first image 104 and the second image 106 are three dimensional rectangular objects having a depth into the screen and the third image 108 is a two dimensional plane extending behind the first image 104 and the second image 106.

The first image 104 and the second image 106 also cast a first shadow 110 and a second shadow 112, respectively due to the position of the light source 102. The screen 100 displays images which not only overlap each other, but also produce non-visible portions. The first image 104 and the second image 106 block the visibility of the third image 108 because spatially, portions of the first image 104 and the second image 106 are displaced in front of third image 108. Also, the first shadow 110 and the second shadow 112 block the visibility of portions of the third image 108 as the shadows are also spatially disposed in front of the third image. As illustrated, on display 100, a portion of the first shadow 110 is not visible because a portion of the second image 106 is spatially disposed in front of the first shadow 110.

Figure 2:
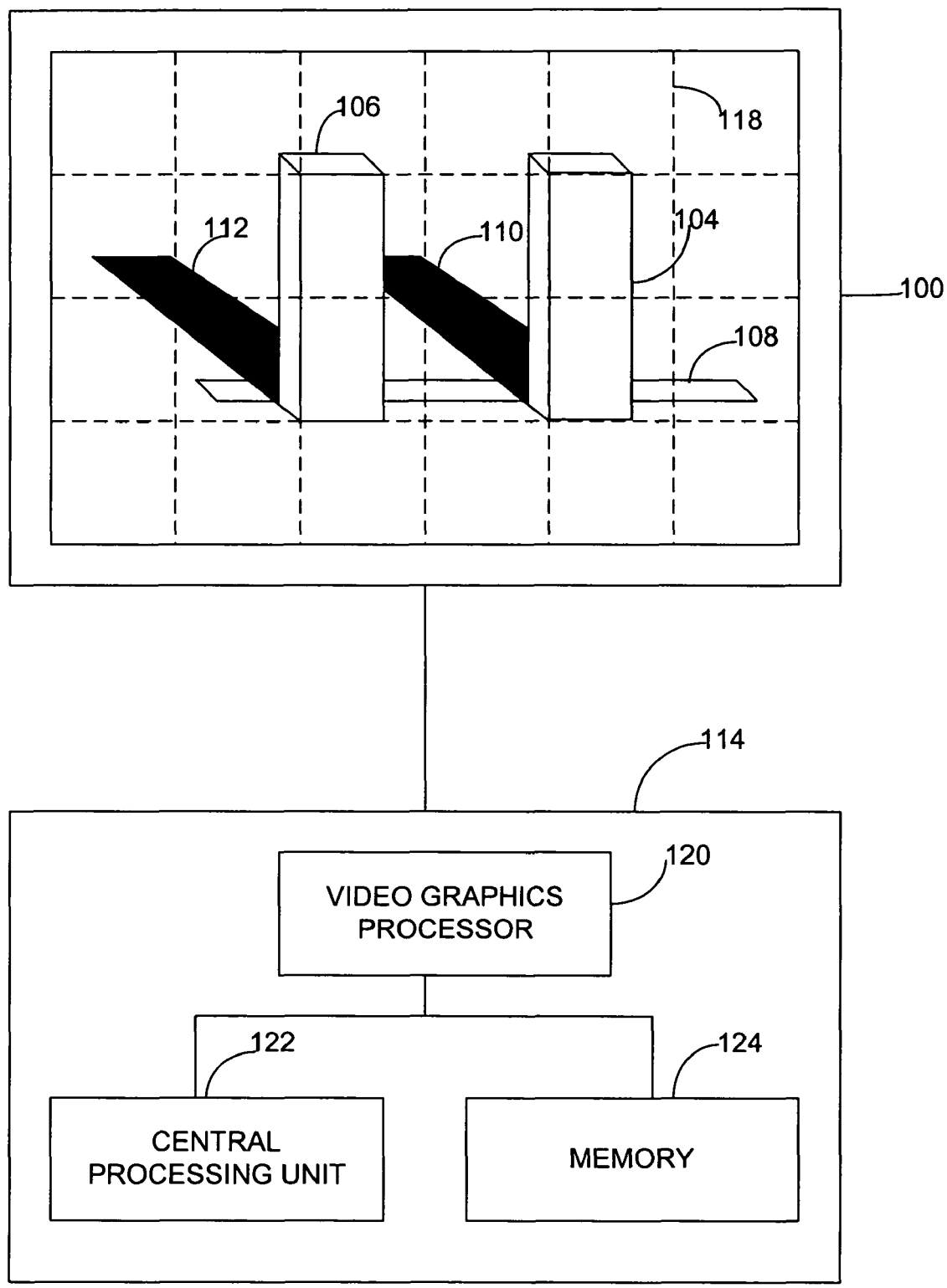
FIG. 2 is a processing system that is in accordance with one embodiment of the present invention.

The present invention improves on the rendering of a graphics display, such as the display 100 by eliminating the rendering of pixels which are not visible due to either being spatially behind another object or disposed within a masked area, such as a shadow. FIG. 2 illustrates a computing system 114 which produces the display 100. In rendering the graphics for display, the display 100 may be divided into an area known as tiles. A tile consists of a plurality of pixels, wherein the graphics processing device may perform computations based on tiles rather than individuals pixels, thereby increasing computing efficiency. Shown generally at 118, the display is divided into a plurality a tiles. As recognized by one skilled in the art, the actual size of the tile, the number of pixels per tile, may be readily adjusted, and the tile dimensions of FIG. 2 are for illustration purposes only, and not herein so limiting.

The computing device 114 includes, among other things, a video graphics processor 120, a central processing unit 122 and a memory 124. The computing device 114 contains further elements which have been herein omitted for clarity purposes only. The video graphics processor 120 receives processing commands from the central processor 122 and receives video graphics information from the memory 124. The video graphics information may also be received from an external source, such as a CD-ROM, a video input connection, another processing device, or any other suitable video input source. The video graphics processor 120 processes the video graphics information and produces the display 100.

Figure 3:
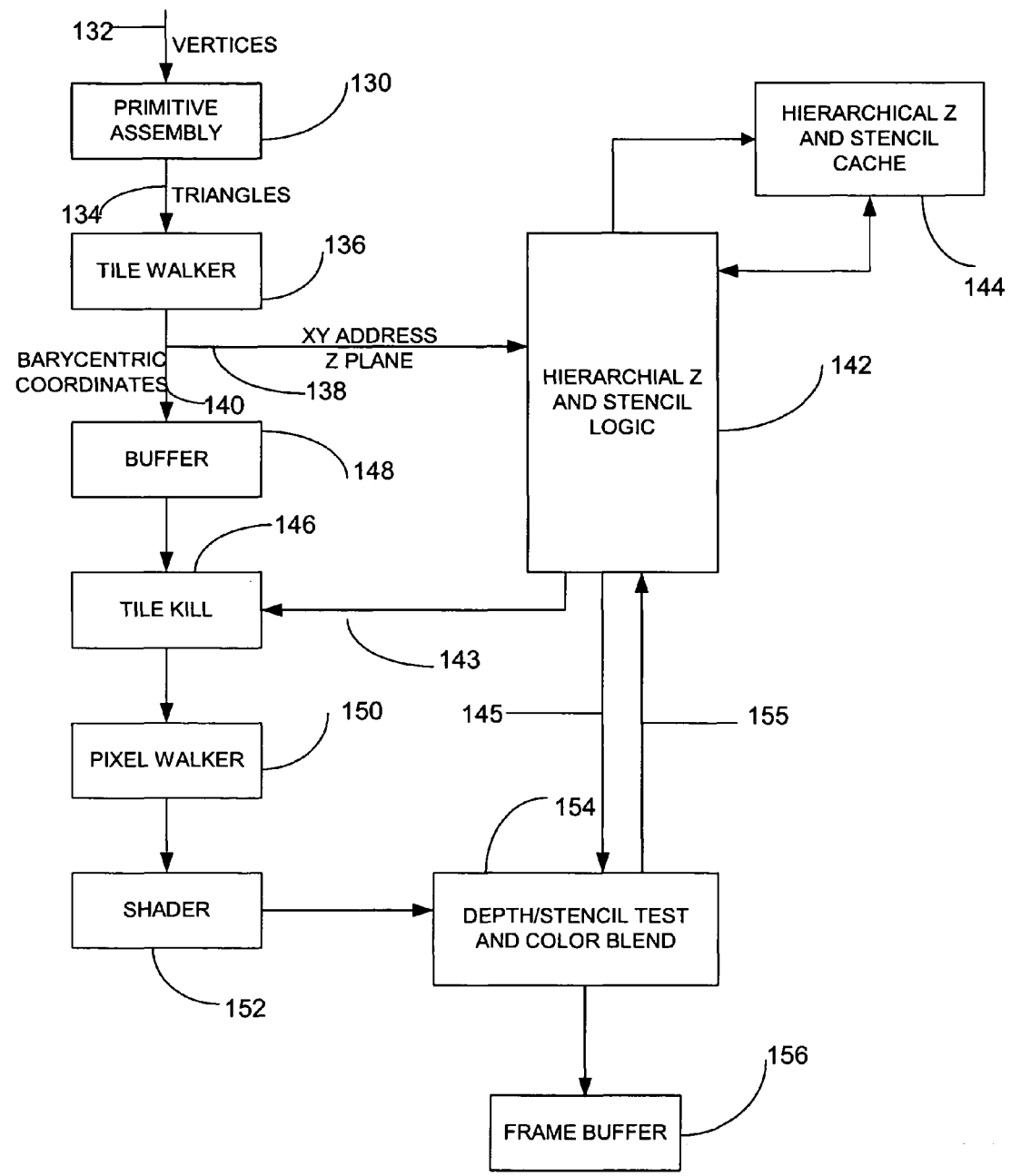
FIG. 3 is a schematic block diagram illustrating a video graphics processor in accordance with one embodiment of the present invention.

FIG. 3 illustrates a functional block diagram of a portion of the video graphics processor 120 in accordance with one embodiment of the present invention. The processor includes a primitive assembly 130 which receives vertices 132 of video information. The primitive assembly 130 produces a plurality of triangles 134 which are provided to a tile walker 136. The tile walker 136 walks the tile thereupon producing barycentric coordinates 138, the tile having a plurality of pixels with the plurality of pixels having a plurality of x,y coordinate addresses and a z plane 140.

The tile walker 136 provides the tile's x,y address and the z plane 140 to a hierarchical Z and stencil logic 142. The hierarchical Z and stencil logic 142 retrieves a hierarchical Z value range and stencil codes from a hierarchical Z and stencil cache 144 in response to the tile x,y address and z plane, wherein the hierarchical Z value per tile is composed of a hierarchical cache MinZ, a hierarchical cache MaxZ and a stencil code. The hierarchical Z and stencil logic 142 thereupon performs a stencil test, as described below. If the stencil test reveals a likelihood that that at least one of the pixels in the tile is visible in light of the mask, the hierarchical Z and stencil logic 142 thereupon performs a hierarchical Z value test, as described below.

Upon the results of the stencil test and the hierarchical Z value test, an indicator 143 is generated, wherein the indicator indicates whether to render the pixels within the tile or kill the tile. If the indicator is a positive indicator, a pass signal is provided to a tile kill 146 and if the indicator is a negative indicator, a kill signal is provided to the tile kill 146. Additionally, an indicator 145 is generated to provide information about the results to depth/stencil test processing block 154. This indicator specifies stencil operations that must be performed to killed tiles and specifies tiles that pass the Z test at all pixels and therefore do not require a detailed Z test.

In addition to generating and providing an indicator 143 to the tile kill 146, the hierarchical Z and stencil logic 142 further updates the hierarchical cache MinZ and the hierarchical cache MaxZ in view of the stencil test and the hierarchical Z test, as described below. Thereupon, the hierarchical Z and stencil logic 142 writes the updated hierarchical cache range values to the hierarchical Z and stencil cache 144.

The tile walker 136 also provides the tile information to a buffer 148, which is operably coupled to the tile kill. When the tile kill receives the indicator, the tile information and the barycentric coordinates, are retrieved from the buffer 148 and either passed to a pixel walker 150 or killed by being discarded from the buffer.

In the event the indicator is a positive indicator and the tile is passed by the tile kill 146, the pixel walker 150 walks to the pixels in the tile to thereby render each pixel within the tile. Once the pixels walker has completed walking the full tile, the pixels are thereupon provided to a shader 152. The shader 152 operates to add a layer of depth to the pixels by performing shading operations thereon. Once the shader 152 is complete, the pixels are provided to a depth and stencil test and color blend 154. The depth and stencil test and color blend 154 performs a further level of refinement in the rendering of the graphics by testing the visibility of the pixels of the tile and thereupon providing the applicable coloring.

As discussed above, the hierarchical Z and stencil logic 142 performs operations on a tile by tile basis, wherein the tile is a plurality of pixels, such as a matrix of 8 by 8 pixels. These tests determine whether to continue the rendering of the pixels within the tile or whether a determination may be made that all of the pixels in the tile are not visible. As recognized by one skilled in the art, a tile that passes the tile kill 146 may still contain at least one pixel which is not visible due to either having a z coordinate behind another pixel at the same x,y coordinate or being behind a mask, therefore the depth and stencil test and color blend 154 determines which pixels are visible and applies the appropriate coloring to thereon. Moreover, the depth and stencil test and color blend 154 also provides to the hierarchical Z and stencil logic 142 updated Z value 144 information relative to specific x,y coordinates. Finally, the hierarchical Z test may discover tiles where the detailed depth test is not required because all pixels are known to pass the depth test, as reported on signal 145. This allows an additional level of optimization, since block 154 can update the depth without performing visibility tests on the pixels in the tile.

Once the depth and stencil test and color blend 154 has determined pixel visibility and applied the appropriate coloring, the completed graphical information is provided to a frame buffer 156. The frame buffer 156 continuously receives pixel information from the depth and stencil test and color blend 154 until a full frame of video information is received. Thereupon, the frame buffer 156 may provide a new video frame to the output device, such as display 100 of FIG. 1.

Figure 4:
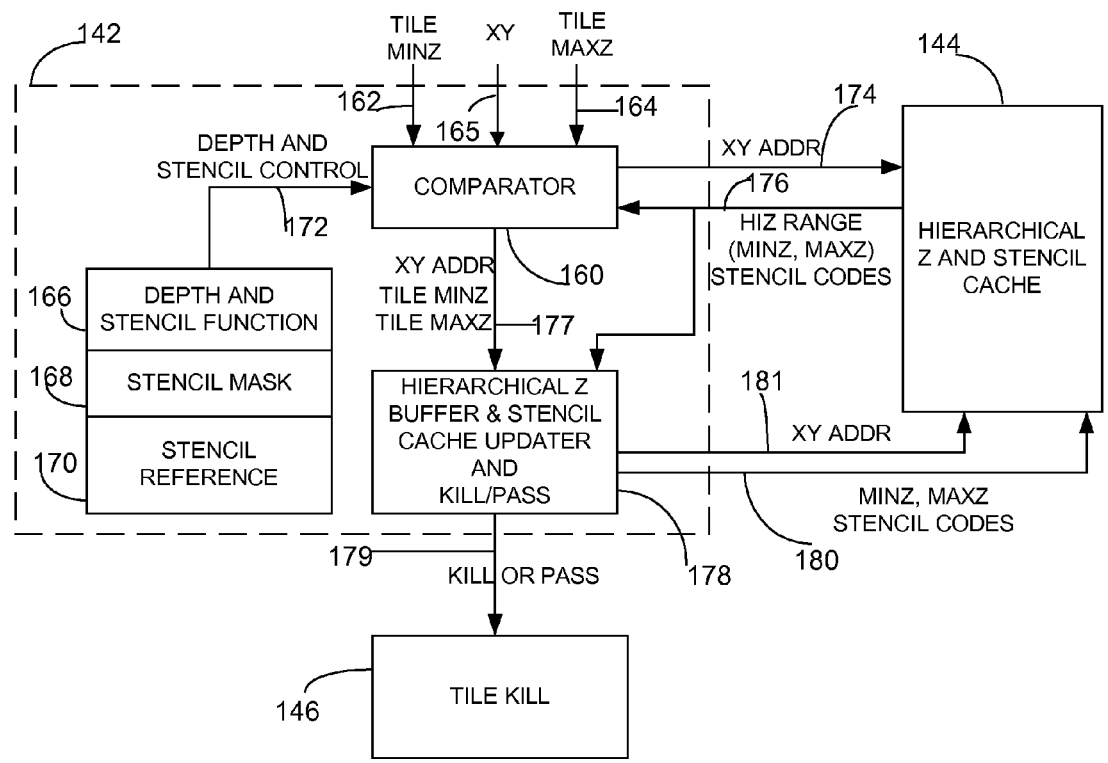
FIG. 4 is a schematic block diagram illustrating a video graphics processor in accordance with one embodiment of the present invention.

FIG. 4 illustrates the graphic processing device in accordance with one embodiment of the present invention. The hierarchical Z and stencil logic 142 includes a comparator 160 which receives the tile range, including the tile MinZ 162 and the tile MaxZ 164 and x,y coordinates 165. The comparator 160 also receives a depth and stencil function, 166, a stencil mask 168 and a stencil reference 170 via a depth and stencil control signal 172. The comparator further provides the tile x,y addresses 174 to the hierarchical Z and stencil cache 144 and receives the hierarchical Z range, hierarchical cache MinZ and hierarchical cache MaxZ, and stencil codes 176.

The comparator 160 performs a stencil test and a hierarchical Z test to determine the visibility of the pixels of the tile. Thereupon, the comparator 160 provides the x,y addresses, the tile MinZ and the tile MaxZ 177 to a hierarchical update and kill/pass module 178. The hierarchical update and kill/pass module 178 updates the hierarchical cache MinZ, hierarchical cache MaxZ and the stencil codes 180 within the hierarchical Z and stencil cache 144 in response to the comparator 160, also providing the x,y addresses 181. The module 178 also generates an indicator 179 which is provided to the tile kill 146, wherein as discussed above, the indicator indicates whether the tile is to be passed or killed based on a determination of whether it is guaranteed that the pixels within the tile would be visible in the rendered graphical image.

FIG. 5 illustrates the steps of a flowchart of the hierarchical Z and stencil logic 142 of FIG. 4. The method begins 200 by comparing the tile Z value range, the tile MinZ and tile MaxZ, with a hierarchical Z value range, the hierarchical cache MinZ and the hierarchical cache MaxZ, and a stencil code, designated at step 202. In response to the comparison, the next step 204 is updating the hierarchical Z value range and the stencil code in response thereto. The next step, 206, is determining whether to render a plurality of pixels within the tile based on the comparison of the tile with the hierarchical Z value range and the stencil code.

Within the determination of step 206 a stencil test and a hierarchical Z value test are performed. The stencil test is performed, step 208, wherein the tile either passes or fails the stencil test. If the tile passes the stencil test, the hierarchical Z value test, step 210, is performed to determine if the pixel is visible or obstructed from view by another pixel. If the stencil test 208 fails or the stencil test passes and the hierarchical Z value test 210 fails, the tile is killed, step 212. Otherwise, if the stencil test 208 passes and the hierarchical Z buffer test passes, indicating that at least one of the pixels within the tile is visible, the tile is rendered, step 214. Thereupon, the method is complete, step 216.

FIG. 6 illustrates a flowchart of another embodiment of the present invention wherein the process begin 220 by receiving a tile having a plurality of pixels 222. The next step, 224, is determining if the tile is visible relative to a stencil by generating a stencil code and comparing the stencil code to a stencil value and a mask. Thereupon a determination is made if the tile is visible in a hierarchical Z plane by receiving a MinZ and a MaxZ for the tile, comparing the MinZ and the MaxZ to a hierarchical Z range and wherein at least one of the plurality of pixels is visible in the z-plane, indicating the tile is visible in the hierarchical Z plane, step 226.

Next, an indicator is generated, wherein the indicator indicates a positive indication when it is determined that the at least one of the pixels in the tile is visible relative to the stencil and in the hierarchical Z plane and the indicator indicates a negative indication when it is determined that that none of the pixels are visible relative to either the stencil mask or the hierarchical Z plane, step 228. Thereupon, designated at step 230, the pixels of the tile are rendered if the indicator indicates a positive indication and the tile is killed upon a negative indication. The hierarchical Z value range and the stencil code is then updated, step 232. Thus the method is completed, step 234, and the tile has been rendered or killed based on the eventual visibility of the pixels of the tile.

More specifically regarding the tile stencil test, FIG. 7 illustrates a table representing one embodiment of a stencil code, wherein the stencil code is three bits specifying whether any stencil values in the tile are equal to, less than, or greater than the background stencil value upon which the tile is being compared. In one embodiment, the stencil code of 000 is used to clear the stencil values to a background value without writing to a depth buffer.

The stencil code may be used to kill tiles if the reference value in the stencil test matches the background stencil value. FIG. 8 illustrates a table representing the results of eight different stencil tests against the stencil codes. In the table of FIG. 8, the term fail indicates that all stencil comparisons in tile fail, the term pass indicates that all stencil comparisons in tile pass, and the term both means the some of the tile may pass and that some of the tile may fail wherein fail indicates the pixels as not visible.

In response to the stencil test, each stencil value may be modified. The table of FIG. 9 illustrates one embodiment of how to modify the stencil code for the tile, based on the applicable stencil operation in the table of FIG. 8. Some stencil operations have two columns, since the result depends on whether the background value is =0, >0, for example. Also, multiple stencil operations may need to be performed to the stencil code as portions of the tile may both pass and fail the stencil test. Thereupon, the modified stencil code is provided back to the hierarchical Z and stencil cache. The asterisk in the table of FIG. 9 indicate stencil codes that cannot occur, such as it is not possible for any stencil values to be less than a background stencil value of zero.

Whereupon, in the stencil test, if all pixel values fail the stencil test, it is determined that even if the pixels of the tile were rendered, they would not be visible and therefore the tile is killed. In the event it is not guaranteed that the tile is not visible relative to the stencil, i.e. a pass or both result occurs, the hierarchical Z buffer test, also known as a depth test, is performed. In one embodiment, the tile contains two depth values, TminDepth and TmaxDepth, which represent the smallest and largest Z values of pixels in the tile, respectively, based on the range of Z plane values within the tile. The comparator also receives the hierarchical cache MinZ and the hierarchical cache MaxZ which may be readily compared to TminDepth and TmaxDepth.

The hierarchical Z buffer test compares a depth value from the tile against the depth value at tile x,y coordinates. Also provided are two more depth values, PminDepth and PmaxDepth which represent the smallest and largest vertex depth values for the primitive being rendered. FIG. 10 illustrates a table representing the depth function of comparing the primitive depth values, PminDepth and PmaxDepth, to the tile depth values, TminDepth and TmaxDepth.

As a result of the comparison, the TminDepth and the TmaxDepth values need to be updated. If the depth test does not fail, e.g. either pass or both, and depth updates are enabled, then either the hierarchical cache MinZ must be set to the minimum of either TminDepth or PminDepth or the hierarchical cache MaxZ must be set to the maximum of either TmaxDepth or PmaxDepth, or both. Further, if the test passes, as show in the table, then depth tests need not be performed at individual pixels, since the comparison has demonstrated that all depth tests will pass.

It should be understood that the implementation of other variations and modifications of the invention in its various aspects will be apparent to those of ordinary skill in the art, and that the invention is not limited by the specific embodiments described. For example, the tile may be a tile having a dimensions of 2 pixels by 2 pixels or a dimension of 4 pixels by 4 pixels, or the stencil code may contain more or fewer indicator bits to represent pre-rendering analysis of a tile relative to a stencil. Further, multiple copies of the hierarchical logic may exist at different tile sizes. It is therefore contemplated to cover by the present invention, any and all modifications, variations, or equivalents that fall within the spirit and scope of the basic underlying principles disclosed and claimed herein.

What is claimed is:

1. A method for hierarchical Z buffering and stenciling carried out by a graphics processing device comprising:
    comparing, by the graphics processing device, a tile Z value range of a tile comprised of a plurality of pixels with a hierarchical Z value range and a stencil code specifying whether stencil values in the tile are at least equal to, less than or greater than a background stencil value upon which the tile is being compared;
    updating, by the graphics processing device, the hierarchical Z value range and the stencil code in response thereto; and
    determining, by the graphics processing device, whether to render a plurality of pixels within the tile based on the comparison of the tile Z value range with the hierarchical Z value range and the stencil code.

2. The method of claim 1 wherein determining whether to render a plurality of pixels further comprises:
    determining at least one of the following: (1) if a stencil test fails, (2) if the stencil test passes and a hierarchical Z value test fails and (3) if the stencil test passes and the hierarchical Z value test passes on at least one pixel in the tile.

3. The method of claim 2 further comprising:
    rendering the pixels of the tile when the stencil test passes and the hierarchical Z value test passes on at least one pixel of the plurality of pixels in the tile.

4. The method of claim 2 further comprising:
    killing the tile when at least one of the following occurs: the stencil test fails or the stencil test passes and the hierarchical Z value test fails.

5. The method of claim 1 wherein the tile Z value range contains a tile MinZ and a tile MaxZ and the hierarchical Z value range contains a hierarchical cache MinZ and a hierarchical cache MaxZ.

6. The method of claim 5 wherein the stencil code is only a three bit data value.

7. The method of claim 1 wherein determining whether to render a plurality of pixels further comprises:
    determining if a per-pixel depth operation needs to be performed; and
    determining if stencil operations need to be performed.

8. The method of claim 1, wherein comparing the tile Z value range with the hierarchical Z value range and the stencil code comprises comparing the stencil code to a stencil value and a stencil mask.

9. The method of claim 1 wherein comparing the stencil code comprises comparing the stencil code that represents whether a background value is equal to all stencil values, that the background value is less than all stencil values, that the background value is less than or equal to all stencil values, that the background value is greater than all stencil values, that the background value is equal to or greater than all stencil values, that the background value is greater than or less than all stencil values, but not equal to any stencil values, and to replace all stencil values with background when reading a tile from memory.

10. A method for hierarchical Z buffering and stenciling carried out by a graphics processing device comprising:
    receiving, by the graphics processing device, a tile having a plurality of pixels;
    determining, by the graphics processing device, if the tile is visible relative to a stencil;
    determining, by the graphics processing device, if the tile is visible in a hierarchical Z plane; and
    updating, by the graphics processing device, a hierarchical Z value range and a stencil code specifying whether stencil values in the tile are at least equal to, less than or greater than a background stencil value upon which the tile is being compared in response thereto, wherein the stencil code is a multiple-bit indicator which specifies a relation of all stencil values in the tile relative to a background value.

11. The method of claim 10 further comprising:
    generating an indicator to indicate whether to render the plurality of pixels within the tile.

12. The method of claim 11 wherein generating the indicator includes:
   determining if a per-pixel depth operation needs to be performed; and
   determining if stencil operations need to be performed.

13. The method of claim 11 wherein the indicator indicates a positive indication when it is determined that the tile is visible relative to the stencil and it is determined that the tile is visible in the hierarchical Z plane and wherein the indicator indicates a negative indication when it is determined that the tile is not visible relative to the stencil or it is determined that the tile is not visible in the hierarchical Z plane.

14. The method of claim 13 wherein the pixels of the tile are rendered if the indicator indicates the positive indication and wherein the tile is killed if the indicator indicates the negative indication.

15. The method of claim 10 wherein determining if the tile is visible relative to the stencil comprises:
   generating the stencil code; and
   comparing the stencil code to a stencil value and a stencil mask.

16. The method of claim 15 wherein determining if the title is visible in a hierarchical Z plane comprises:
   receiving a MinZ and a MaxZ for the tile; and
   comparing the MinZ and the MaxZ to a hierarchical Z range, wherein at least one of the plurality of pixels is visible in the z-plane, indicating the tile is visible in the hierarchical Z plane.

17. A graphics processing engine comprising:
   a comparator operative to receive a tile MinZ and a tile MaxZ associated with a tile having a location and a plurality of pixels;
   a hierarchical Z buffer and stencil cache operably coupled to the comparator; and
   a hierarchical Z buffer and stencil cache updater operably coupled to the comparator, wherein the hierarchical Z buffer and stencil cache provides a cache MinZ, cache MaxZ, and a stencil code specifying whether stencil values in the tile are at least equal to, less than or greater than a background stencil value upon which the tile is being compared to the comparator, wherein the cache MinZ and the cache MaxZ are associated with the location of the tile and wherein the comparator compares the tile MinZ and the tile MaxZ to the cache MinZ and the cache MaxZ, and compares the stencil code to a stencil value and a stencil mask.

18. The graphics processing engine of claim 17 wherein the comparator determines if a per-pixel depth operation needs to be performed and determines if stencil operations need to be performed.

19. The graphics processing engine of claim 17 wherein the comparator generates an indicator that indicates the visibility of the plurality of pixels of the tile relative the stencil mask and a hierarchical Z plane.

20. The graphics processing engine of claim 19 further comprising:
   a kill module operably coupled to the hierarchical Z buffer and stencil cache updater wherein the hierarchical Z buffer and stencil cache updater receives the indicator from the comparator and the hierarchical Z buffer and stencil cache updater provides a kill signal to the kill module based on the indicator and wherein the hierarchical Z buffer and stencil cache updater updates the hierarchical Z buffer and stencil cache in response to the indicator.

21. A method for hierarchical Z buffering and stenciling carried out by a graphics processing comprising:
   determining, by the graphics processing device, if a tile comprised of a plurality of pixels, is visible relative to a stencil by generating a stencil code specifying whether stencil values in the tile are at least equal to, less than or greater than a background stencil value upon which the tile is being compared and comparing the stencil code to a stencil value and a mask; and
   determining, by the graphics processing device, if the tile is visible in a hierarchical Z plane by comparing a MinZ and a MaxZ for the tile to a hierarchical Z range.

22. The method of claim 21, further comprising:
   generating an indicator wherein the indicator indicates a positive indication when the tile is visible relative to the stencil and visible in the hierarchical Z plane, and wherein the indicator indicates a negative indication when the tile is not visible relative to the stencil or in the hierarchical Z plane;
   rendering pixels of the tile if the indicator indicates the positive indication; and
   killing the tile if the indicator indicates the negative indication.

23. The method of claim 22, further comprising updating the hierarchical Z value range and the stencil code.

24. A method for hierarchical Z buffering and stenciling carried out by a graphics processing device comprising:
   determining, by the graphics processing device, if a tile comprising of a plurality of pixels, is visible relative to a stencil by generating a stencil code specifying whether stencil values in the tile are at least equal to, less than or greater than a background stencil value upon which the tile is being compared and comparing the stencil code to a stencil value and a mask;
   determining, by the graphics processing device, if the tile is visible in a hierarchical Z plane by comparing a MinZ and a MaxZ for the tile to a hierarchical Z range; and
   generating, by the graphics processing device, a signal indicating that a detailed depth test is not required because all pixels of the tile are known to be visible in the hierarchical Z plane.

* * * * *